March 27, 1962  LE ROY J. LANGE  3,027,512
ROUTINER FOR TOTALISATOR SYSTEMS
Filed Feb. 29, 1960  10 Sheets-Sheet 1

FIG. 1

INVENTOR.
LeRoy J. Lange
BY George H. Simmons
Atty

FIG. 2

March 27, 1962 LE ROY J. LANGE 3,027,512
ROUTINER FOR TOTALISATOR SYSTEMS
Filed Feb. 29, 1960 10 Sheets-Sheet 4

March 27, 1962 LE ROY J. LANGE 3,027,512
ROUTINER FOR TOTALISATOR SYSTEMS
Filed Feb. 29, 1960 10 Sheets-Sheet 6

LE ROY J. LANGE 3,027,512

ROUTINER FOR TOTALISATOR SYSTEMS

Filed Feb. 29, 1960

LE ROY J. LANGE 3,027,512

ROUTINER FOR TOTALISATOR SYSTEMS

Filed Feb. 29, 1960

United States Patent Office 3,027,512
Patented Mar. 27, 1962

3,027,512
ROUTINER FOR TOTALISATOR SYSTEMS
Le Roy J. Lange, Towson, Md., assignor to American Totalisator Company, Division of Universal Controls, Inc., Towson, Md., a corporation of Maryland
Filed Feb. 29, 1960, Ser. No. 11,696
14 Claims. (Cl. 324—73)

This invention relates to a routiner for routine testing of totalisator systems and has for its principal object the provision of a new and improved routiner of this kind.

It is a main object of the invention to provide a routiner for testing the adding machines, combine units, and collectors of a totalisator system under conditions that duplicate the conditions encountered by such devices in the normal operation of the system.

Another object of the invention is to provide a routiner that can be preset to insert a predetermined set of bets of predetermined value into each of the three pools of a totalisator system and to repeat the inserting of this set of bets therein a number of times that can be varied over wide limits.

Another object of the invention is to provide in a routiner, controls by which the individual runner adding machines in the pools of the totalisator system are operated one at a time in sequence, and in which the change from one machine to the next is effected only after a preselected number of operations of the previously operated adding machine have been completed.

Another object of the invention is to provide a routiner that is arranged to insert bets simultaneously in each channel of a totalisator system that has two or more channels and also simultaneously in each of the three pools of the system, and is further arranged to step to the next preselected operation only after a predetermined total number of bets have been inserted in the system by the routiner.

Another object of the invention is to provide a routiner that can be arranged to repeatedly insert a set of bets in a selected pool and only in a selected runner adding machine in that pool, which bets can be inserted over one or more of the channels leading into that adding machine.

Another object of the invention is to provide a routiner that is of simple design that can be manufactured and maintained at low cost without sacrificing quality.

Further objects of the invention not specifically mentioned here will be apparent from the detailed description and claims which follow, reference being had to the accompanying drawings in which a preferred embodiment of the invention is shown by way of example and in which:

The routiner of the present invention is designed for use in a totalisator system having a win pool, a place pool, and a show pool, and a combine unit through the operation of which registrations are made in either the three pools or the win and place pools only in response to the operation of a single ticket issuing machine. In such a system each of the pools contains a total adding machine or TAM, a collector through the operation of which the total adding machine is connected to a group of ticket issuing machines or TIM's one at a time in sequence when all TIM's contain operated keys, the circuit being extended through the TIM to one of a plurality of runner adding machines or RAM's selected by the depressing of a corresponding key in the TIM. TIM's having no operated keys are skipped by the collectors, and in case only one TIM contains an operated key it is connected to the TAM immediately.

Totalisator systems of this kind frequently employ more than one channel over which bets may be registered, and the routiner of the present invention is designed for use in a multi-channel system. Specifically the invention is shown by way of example in connection with the two-channel totalisator system shown in my co-pending application, Serial No. 845,395, filed October 9, 1959, although its teachings are not limited to this particular system.

In the system of this co-pending application there are two channels, the first or $2.00 channel handling the registration of $2.00 bets, and the second or so-called "big money" channel handling the registration of $5.00, $10.00, $50.00 and $100.00 bets. Each channel is equipped with a collector and the system is arranged to effect registrations simultaneously over the two channels.

The routiner of the present invention is provided with a plurality of sections, one for effecting the testing of the adding machines in the win pool, a second section for effecting the testing of adding machines in the place pool, a third section for effecting the testing of adding machines in the show pool, and a fourth section for effecting the testing of the combine unit which is arranged to register bets in all three of the pools and over both channels leading thereto, or in but two of those pools when desired.

In order to duplicate operating conditions as encountered by the totalisator system in its normal use, each section of the routiner is equipped to simultaneously prepare circuits for the insertion of a plurality of bets. The collectors of the respective pools pick up the routine equipments in the corresponding section in predetermined order over each of the two channels to operate the adding machines over the two channels simultaneously, thereby duplicating conditions encountered in normal service.

Each section of the routiner is equipped with a plurality of bet inserting equipments each consisting of a key, a bet accepting relay and associated circuits through the operation of which a predetermined value is entered in the adding machines. In one instance each pool section of the routiner was equipped with fourteen bet inserting equipments, four of which were arranged to insert $2.00 bets over the $2.00 channel of the system, three of which were arranged to insert $5.00 bets over the BM channel thereof, three of which were arranged to insert $10.00 bets over the BM channel, two of which were arranged to insert $50.00 bets over this same channel, and one was arranged to insert $100.00 bets over this channel. In addition, the combine section of the routiner is equipped with four $6.00 combine equipments over which $2.00 bets are inserted in the win, place and show pools, or in the win and place pools only, as desired, and the combine section also included four $15.00 combine equipments over which $5.00 bets are inserted in the win, place and show pools, or in the win and place pools only.

The value of registrations to be effected in the adding machines of the pools are determined by operation of the keys by which the routiner is controlled. After the desired values have been selected, the controls of the routiner are operated to cause the selected values to be inserted in the adding machines in a number of different ways.

If desired, the routiner controls can be set so that one set of bets is inserted in the TAM's and in RAM 1 in each of the pools, at the end of which operation an indication cycle is initiated so as to display the values registered. The routiner can then be set to step to RAM 2 and the same series of bets inserted in the total adding machines of the three pools and the RAM's 2 therein. This process may be continued until each RAM has received this series of bets. The control equipment of the routiner can be adjusted so as to repeat the selected series of bets a predetermined number of times before changing from one RAM to another, at the end of which an indication cycle in initiated to check the accuracy of the registrations thus effected.

While the routiner is equipped to test all three pools and the combine unit simultaneously, the controls thereof include keys by the operation of which bets may be inserted in any one of the pools exclusively, and the controls further include means whereby the series of bets can be repeatedly inserted in the total adding machine and a selected RAM in a selected pool, none of the other RAM's being operated.

As will be seen in the above mentioned copending application, the collectors are arranged so that each start relay and each collector relay therein handles two ticket machines, connections being extended to one thicket machine over the main chain of the collector and connections being extended to the other ticket machine over the reflex chain thereof. The routiner of the present invention acquires access to the adding machines over the same start and collector relays that are used to connect the TAM to the various TIM's. Thus a part of the start and collector relays of the collectors handle three independent circuits with the third or routiner circuit extending over either the main or reflex chains of the collector as required. Obviously with an arrangement of this kind, the test would be interfered with if one of the ticket machines were to have a key in it depressed while the routine was being applied to the pool in which that particular TIM is located. To guard against contingency of this kind, the routiner of the present invention is arranged to disconnect all of the TIM's during the operation of the routiner, this being accomplished through the BLO relays of the system to render the depressing of a key in a TIM ineffective to close the circuit of the associated collector start relay and also to prevent the closing of the betting circuit through the TIM.

Through the use of the routiner of the present invention a number of bets are inserted in each of the adding machines in each of the pools during the servicing of the system prior to each day's actvities thereof and the number of bets inserted during this routine test is maintained high enough to insure that the adding machines and collectors are functioning properly.

In the drawings I have shown the routiner in some detail in connection with the win pool of a totalisator system and also in connection with the combine unit thereof. The place and show pools duplicate the equipment of the win pool and are not shown in any detail to avoid an unnecessary complication of the drawings. Nor has the equipment of the win pool been shown in toto; rather I have shown but one of the four $2.00 bet inserting equipments, one of the three $5.00 bet inserting equipments, one of the three $10.00 bet inserting equipments, one of the three $50.00 bet inserting equipments, and the $100.00 equipment. The combine section of the routiner has likewise been simplified by showing but one $6.00 combine equipment and one $15.00 combine equipment, which equipments also insert $4.00 and $10.00 combines when required.

Figure 1:
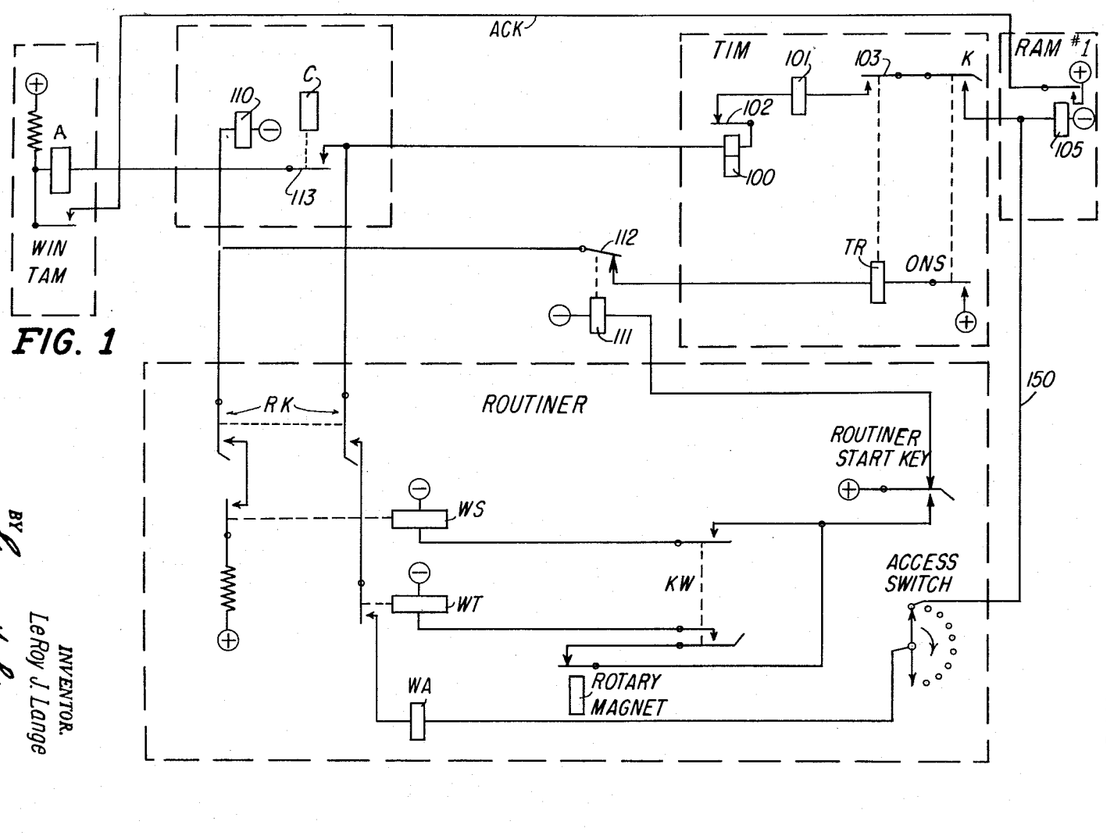
FIG. 1 is a simplified circuit schematic showing the bypassing of the ticket machines by the routiner.

As will be seen in FIG. 1, each TIM includes a runner selecting key K, a TR relay, an acceptance relay 100, and off normal springs ONS which are operated by any one of the keys K of the machine. The collectors include a start relay 110 the circuit of which is closed only when the BLO relay 111 is in operated position. Relay 111 is maintained operated through the routiner start key so long as that key is in its normal position, as it will be except when the routiner is in operation. Thus when the key K is depressed and the off normal switch ONS operated, positive is extended from this switch through the TR relay of the TIM, through spring 112 and its make contact, through the winding of start relay 110 of the collector to negative, operating relays 110 and TR. Thus when the collector relay associated with the relay 110 operates and closes spring 113 against its make contact, a circuit may be traced from positive through resistance and the acceptance relay A of the TAM, spring 113 and its make contact, acceptance relay 100 of the TIM, spring 102 and its break contact, relay 101 of the TIM, through springs 103 closed by the operation of relay TR through the spring of key K and its make contact, through the winding of acceptance relay 105 of the RAM 1 to negative.

Relays A and 105 operate over this circuit but relay 100 does not immediately. Operation of relay 105 is shown to close a circuit from positive over the conductor ACK and through make contact on the A relay to the junction of the A relay and a resistance, thereby short-circuiting that resistance to increase the current flowing into that circuit sufficiently to cause relay 100 to operate. Operation of relay 100 initiates an operation of the TIM to print and issue the ticket and at springs 102 opens the above traced circuit.

As will be seen in the above mentioned co-pending application, the acknowledging circuit is closed through contacts on a slave relay and a register switch associated with the acceptance relays in the TAM and RAM's. In order to avoid an unnecessary complication of the drawings herein, this circuit is shown as closed by the acceptance relays themselves since it is the operation of the acceptance relays that initiates operations which result in the closing of the acknowledging circuit.

When the routiner start key is operated to start an operation of the routiner, the circuit of relay 111 will be opened and even though the key K of the TIM be depressed neither the relay 110 of the collector nor the relay TR of the TIM will be operated since the circuit thereof will be opened at springs 112. The betting circuit will not be completed since it is maintained open at springs 103 notwithstanding that the key K may be depressed. Through this arrangement interference with a routiner test by the operation of a key in the TIM is definitely prevented.

Prior to operating the routiner start key to initiate a routiner operation, the bet inserting equipment key such as RK, and pool selecting key such as KW, are operated. As a result when the routiner start key is operated, the start relay WS and the bet inserting relay WT are operated over the obvious circuit. Operation of WS closes the obvious circuit for start relay 110 of the associated collector, and when the associated C relay thereof operates and closes spring 113, the circuit is closed from positive through the resistance, and the A relay of the win TAM, through the normally open contacts on the key RK and the relay WT which are now closed, through the acceptance relay WA of the routiner equipment, through the access switch thereof and the acceptance relay 105 of the RAM 1 to negative. Relays 105 and A operate as before, but the routiner relay WA does not operate until the acknowledging circuit is completed and the current flowing through this relay increased to operating value. Thus it will be seen that the bet inserting equipment of the routiner is substituted for the TIM and the access switch of the routiner is substituted for the key such as K in the TIM.

Figure 2:
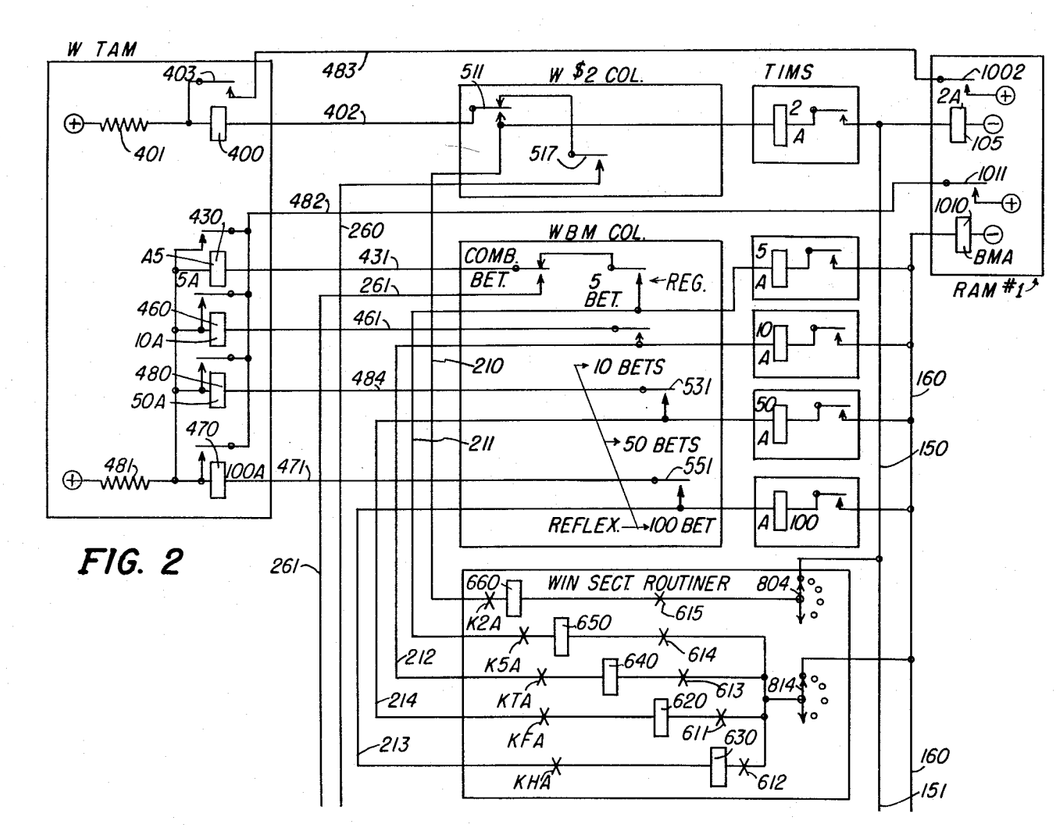
FIG. 2 is a schematic circuit diagram of the win section of the routiner and associated equipment showing the betting and acknowledging circuits with the control circuits omitted.
Figure 3:
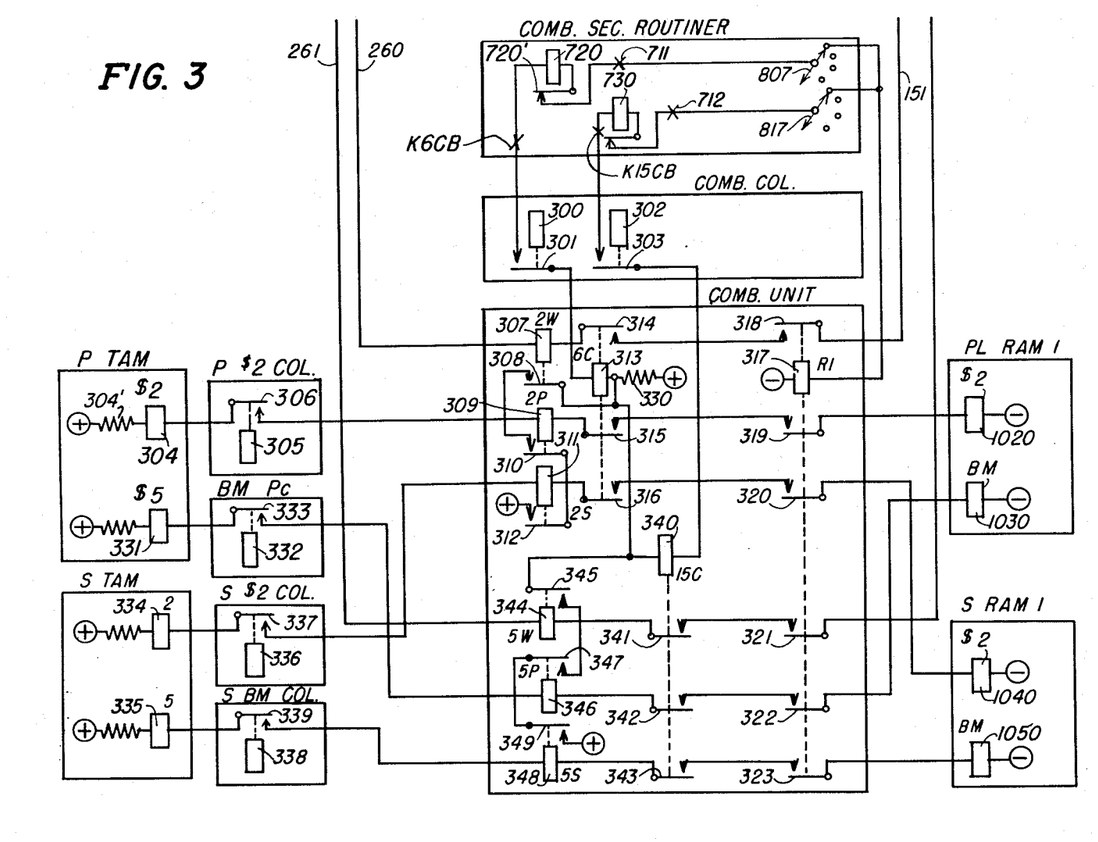
FIG. 3 is a diagram similar to FIG. 2, showing the combine section of the routiner and associated equipment.
Figure 4:
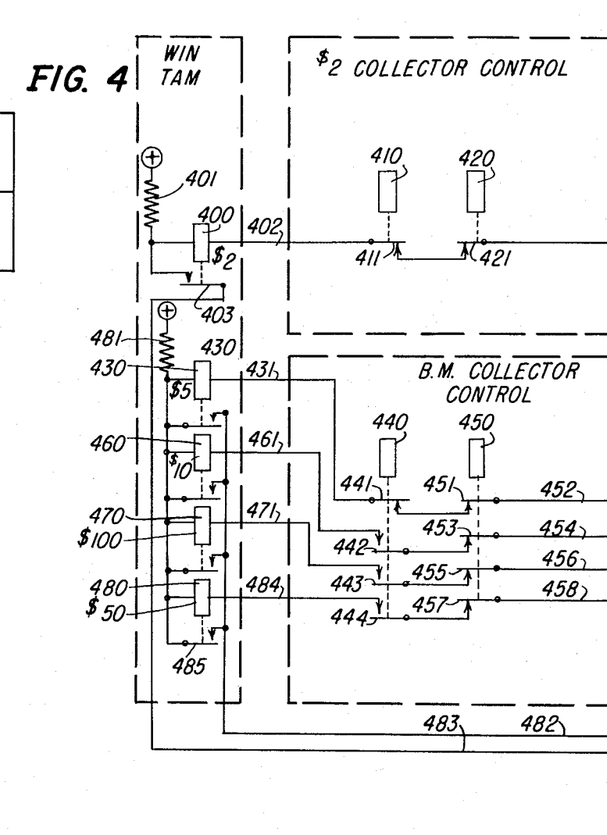
FIG. 4 is a simplified schematic of the win pool TAM and the control sections of the $2.00 and BM collectors of the pool.
Figure 5:
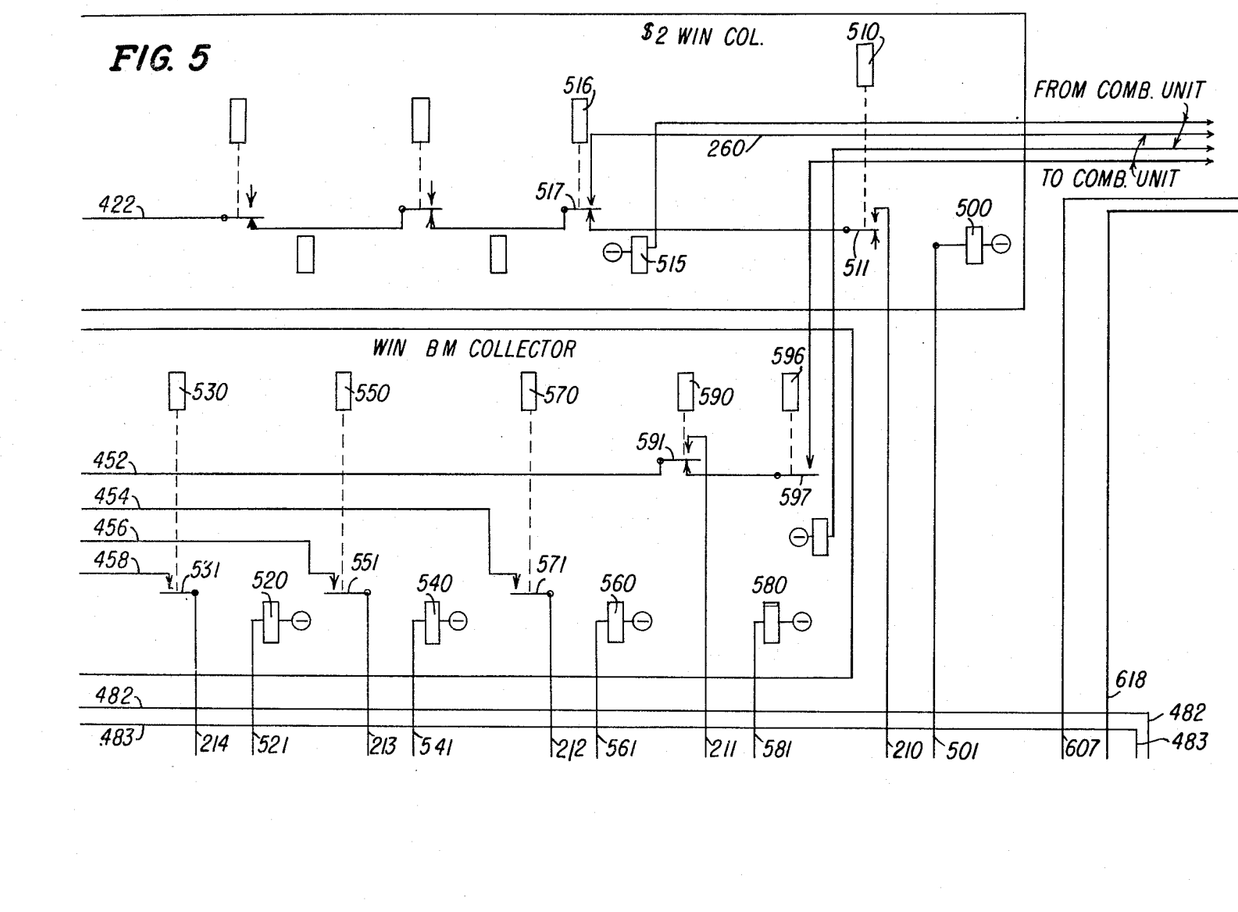
FIG. 5 is a schematic of the remainder of the collectors shown in FIG. 4.

FIGS. 2 and 3 show an amplification of the betting and acknowledging circuits shown in FIG. 1, with the control circuits omitted and by showing in the collectors only the contacts by which circuits are extended through the collector. Only the betting and acknowledging circuits of the win pool are shown in these figures.

As shown, the $2.00 acceptance relay 400 of the win pool TAM is normally connected by the $2.00 collector of the pool in a circuit that extends through the acceptance relay of a $2.00 TIM and thence to the $2.00 acceptance relay 105 of RAM 1 when the key 1, not shown, of the TIM is depressed. When the acceptance relays of the adding machines are operated, an acknowledging circuit is extended to thereby increase the current flowing through the acceptance relay of the TIM to operate that relay and thereby cause the TIM to print and issue the ticket. The TAM $5.00 acceptance relay 430, the $10.00 relay 460, the $50.00 relay 480, and the $100.00 relay 470 are connected one at a time, using regular and reflex circuits, by the big money collector to a corresponding value ticket machine and the circuit extended therethrough to the common big money acceptance relay 1010 of the RAM 1, and when the adding machine relays are operated the acknowledging circuit is closed to increase the current flowing through the acceptance relay of the connected TIM to operate that relay and thereby cause the TIM to print and issue the ticket.

The win section of the routiner contains a $2.00 acceptance relay 660 which is connected to relay 400, through spring 511 of the associated collector relay in the $2.00 collector when that relay's turn is reached and it is operated, thereby to extend a circuit from positive through the resistance 401, relay 400 of the TAM, conductor 402, through spring 511 and its make contact, conductor 210, through the relay 660 of the routiner, through the wiper 804 of the runner access switch of the routiner, conductor 150, through the acceptance relay 105 of the RAM 1 to negative. Relays 400 and 105 operate over this circuit. The acknowledging circuit is completed through springs 1002, conductor 483, spring 403 and its make contact, short-circuiting resistance 401 to increase the current flowing through relay 660 to cause that relay to operate. Thus it will be seen that the routiner by-passes the TIM and substitutes an acceptance relay such as 660 for the acceptance relay of the TIM.

In a similar manner, the $5.00 acceptance relay 650, the $10.00 acceptance relay 640, the $50.00 acceptance relay 620, and the $100.00 acceptance relay 630 of the win section of the routiner are connected to the respective acceptance relays of the TAM through the BM collector springs and the circuit is extended through the wiper 814 of the big money runner access switch to conductor 160 which leads to the big money acceptance relay 1010 of the RAM 1. Through this arrangement a predetermined set of values are registered in the TAM and selected RAM of the pool in a manner hereinafter described.

As will be seen in FIG. 3, the combine section of the routiner includes a $6.00 combine acceptance relay 720 which is connected through the combine collector to the $6.00 combine acceptance relay 313 of the combine unit of the system, and when the relay 300 of the combine collector operates, a circuit is extended from positive through a resistance 330, relay 313, spring 301 and its make contact, through the relay 720, through spring 720' and its break contact, through the wiper 807 of the runner access switch of the routiner to the runner 1 selecting relay 317 of the combine unit to negative, relays 313 and 317 operating over this circuit. Operation of these combine unit relays extends a circuit from the $2.00 acceptance relay 400 of the TAM over conductor 402, spring 511 and its break contact, spring 517 and its make contact, conductor 260, through the relay 307, springs 314 and 318 and their respective make contacts, conductor 151, which connects with conductor 150 to extend the circuit through the acceptance relay 105 of RAM 1. Relays 400 and 105 operate over this circuit and the acknowledging circuit is completed as before to increase the current flowing through relay 307 sufficiently to cause that relay to operate.

Operation of relays 313 and 317 also prepares circuits for the place TAM and runner 1 RAM in the place pool, which circuit is completed when the place $2.00 collector relay 305 operates to close springs 306, thereby completing a circuit from positive through resistance 304', relay 304, relay 309, spring 315 and its make contact, spring 319 and its make contact, relay 1020 to negative, operating relays 304 and 1020, which close the acknowledging circuit of the pool, not shown, to increase the current flowing through relay 309, causing that relay to operate.

Operation of relays 313 and 317 also prepare a circuit for the $2.00 acceptance relay 334 of the show TAM relay 311, acceptance relay 1040 of the RAM 1 in the show pool, which circuit is completed when the $2.00 collector relay 336 of the show pool operates. Relays 334 and 1040 operate and close the pool acknowledging circuit, not shown, which increases the current flowing through relay 311, thereby causing that relay to operate. Relays 307, 309 and 311 thus being operated, an acknowledging circuit is closed from positive through spring 312 and its make contact, spring 310 and its make contact, spring 308 and its make contact, to the junction of relay 313 and the resistance 330, which acknowledging circuit short-circuits the resistance 330, thereby increasing the current flowing through relay 720 sufficiently to cause that relay to operate. Upon operating, relay 720 opens its own circuit and the circuit of relays 313 and 319 by opening springs 720'.

In a similar manner, the $15.00 combine acceptance relay 730 of the combine section of the routiner operates in series with relays 340 and 317 to insert bets over the big money channels in the win, place and show pools to register $5.00 in the TAM and runner 1 adding machines of each of these pools and upon operating opens the circuit through these relays by opening springs 730'.

Oftentimes totalisator systems are arranged to issue $4.00 and $10.00 combine tickets in addition to $6.00 and $15.00 tickets. In such instances the combine section will either have a 4c relay which corresponds to the 6c relay 720, and a 10c relay which corresponds to the 15c relay 730, or relays 720 and 730 will be included in circuit with relays similar to relays 313 and 340, respectively, which latter relays close circuits to only the win and place pools instead of to the three pools as shown. In the combine unit, the acknowledging circuit over which resistance 330 is short-circuited will be closed when two acceptance relays, corresponding to 308 and 309, are operated.

*Inserting a Series of Bets in the Win Pool and Upon Runner 1 Therein*

Figure 6:
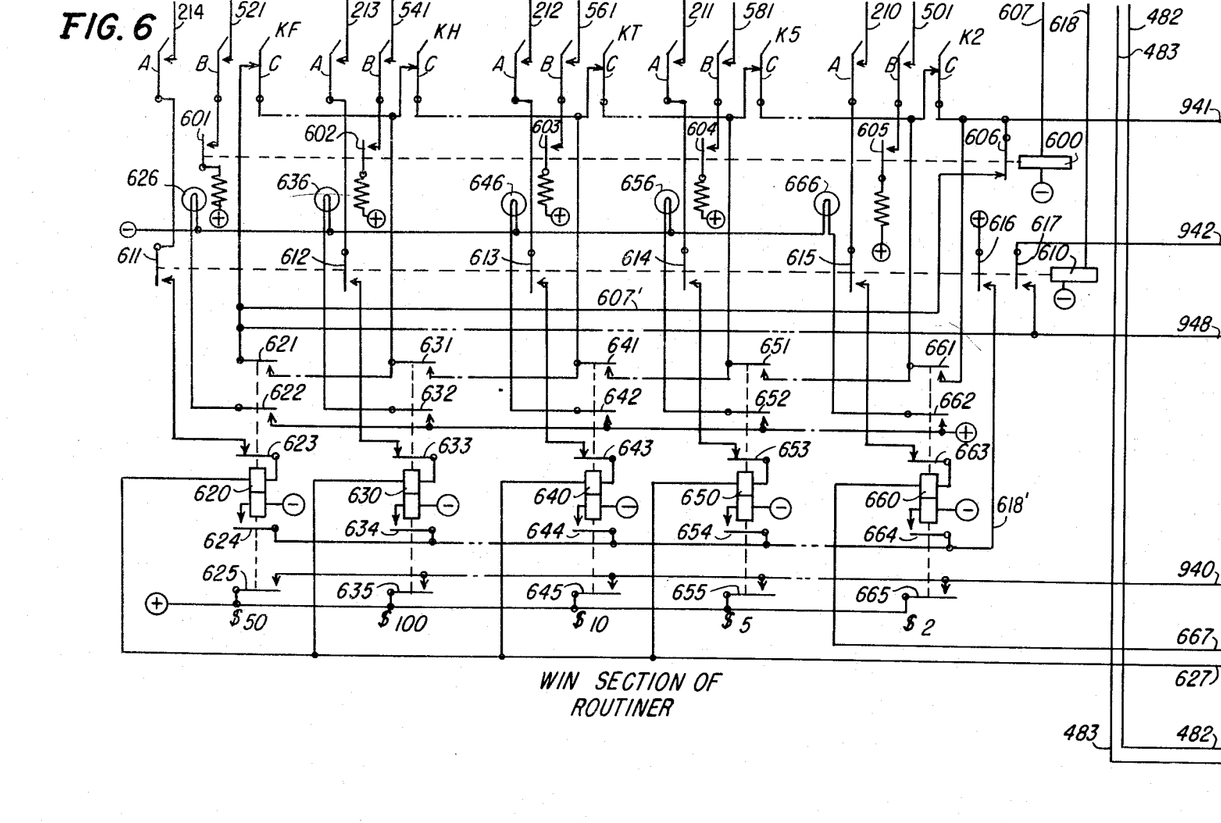
FIG. 6 is a schematic of the win section of the routiner.
Figure 7:
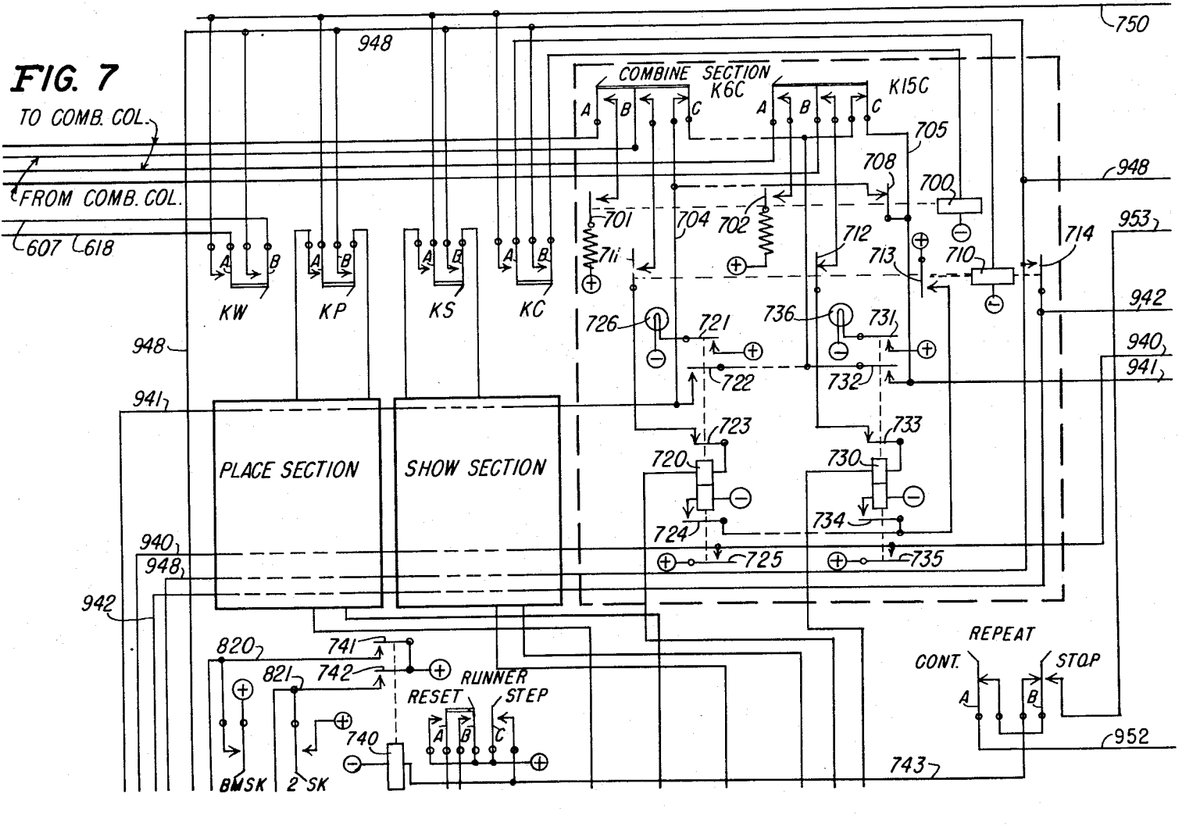
FIG. 7 is a schematic of the combine section, a block diagram of the place and show sections of the routiner, and part of the control keys thereof.

To effect the above, the keys KF, KH, KT, K5 and K2 in the win section of the routiner, FIG. 6, are operated to move their respective A, B and C springs from normal to operated position. Since it is desired to insert bets in the win section, the key KW, FIG. 7, is also operated to move its springs A and B into engagement with their respective make contacts. Since it is assumed that the bets to be inserted are on runner 1 in the win pool, runner step key, FIG. 7, is operated to close its spring C against its make contact thereby to complete a circuit from positive through the winding of the runner step relay 740 to negative. Relay 740 at spring 741 extends a circuit from positive over conductor 820, through the winding of the magnet 810 of the big money access switch, to negative, operating that magnet preparatory to advancing the wipers thereof from their twentieth to their first bank contacts. At spring 742, relay 740 closes a circuit from positive over conductor 821, through the winding of the motor magnet 800 of the $2.00 runner access switch, to negative, operating that magnet preparatory to advancing its wipers from their respective twentieth to their first bank contacts. The runner step key is then released, the magnets restore, and the wipers are advanced.

Figure 8:
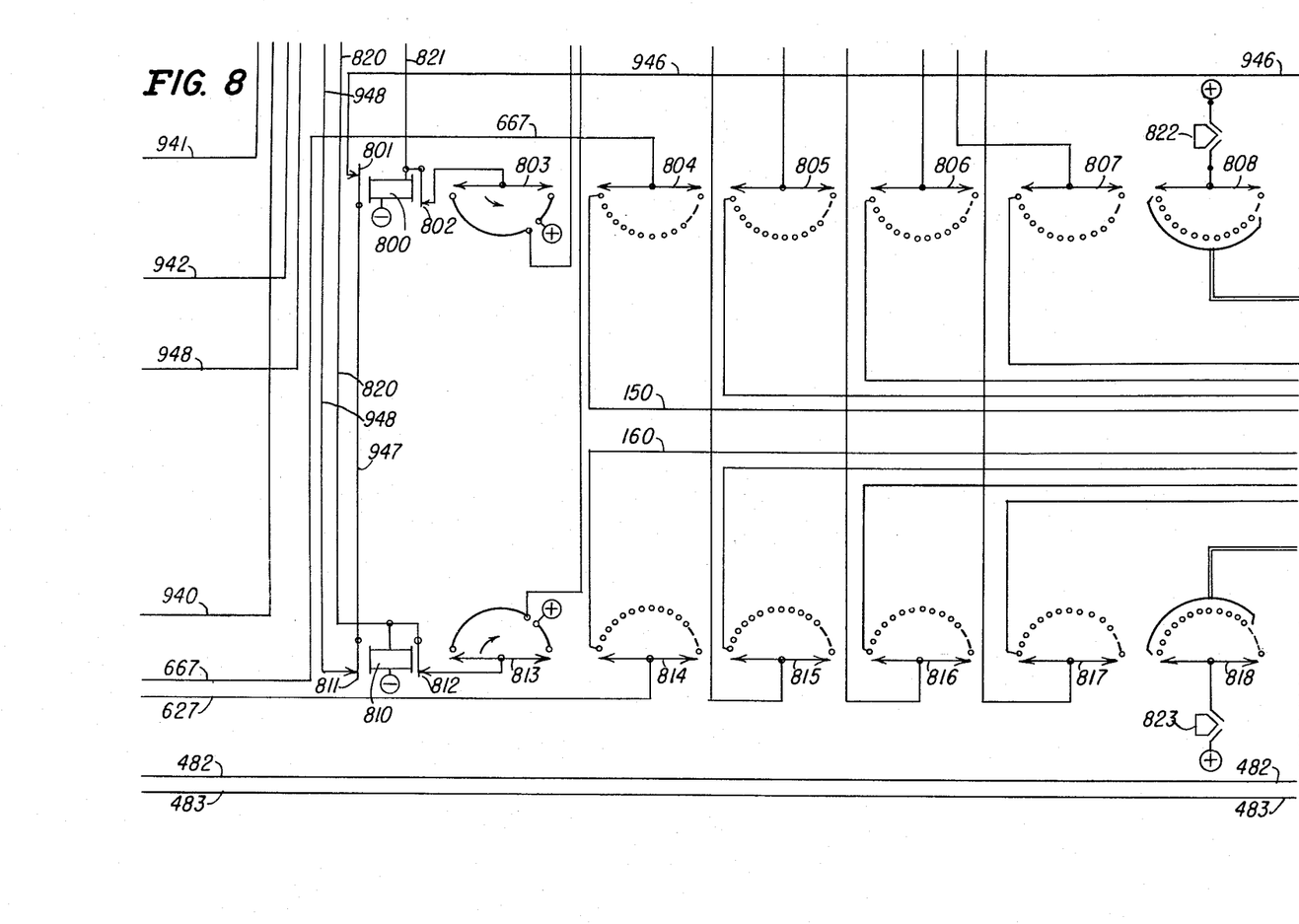
FIG. 8 is a schematic of the runner access switches of the routiner.

Since the access switches are located so as not to be readily seen from the control panel, the operator may check the poistion of these switches by depressing push buttons 822 and 823. Operation of push button 822 closes a circuit from positive, through the wiper 808 of the $2.00 access switch, through the number 1 lamp in the $2.00 lamp group to negative, lighting that lamp to indicate that RAM 1 has been selected by that switch. Operation of push button 823 closes a similar circuit from positive through wiper 818 of the big money access switch to the lamp 1 in the big money lamp group to negative, lighting that lamp to indicate that this switch is set to select RAM 1.

Figure 9:
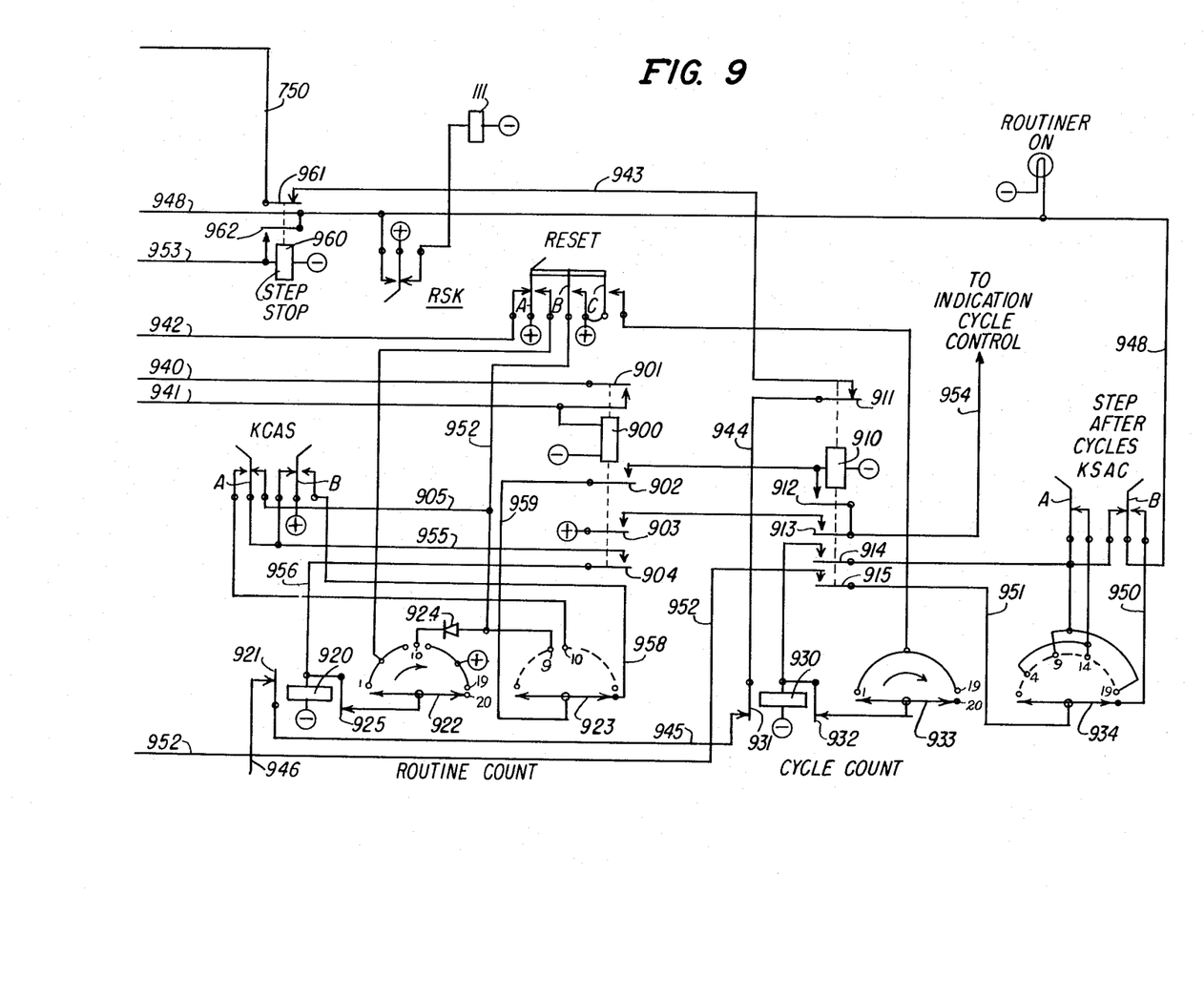
FIG. 9 is a schematic of the routine count and the cycle count switches and the remainder of the control keys and equipment of the routiner.

The routiner thus being set to insert a set of bets in the win pool TAM and RAM 1 therein, the operator may then move start key RSK, FIG. 9, from its normal to its operated position to start the operation of the routiner. Key RSK locks in operated position. This operation of the key RSK opens the circuit of BLO relay 111, thereby disconnecting the TIM's, and applies poistive to conductor 948, lighting the routiner on lamp to indicate that the routiner has been started. Positive on conductor 948 closes a circuit for the start relay 600 of the win section of the pool, which may be traced from this positive, make contact of and spring B of the key KW, conductor 607, through the winding of relay 600 to negative. Relay 600 operates over this circuit and closes a circuit from positive through a resistance, spring 601 and its make contact, the B spring of the key KF and its make contact, conductor 521, through the winding of the $50.00 start relay 520 of the BM collector to negative, operating relay 520. At spring 602, a similar circuit is closed for the $100.00 start relay 540 of the collector. At spring 603, a similar circuit is closed to the $10.00 start relay 560 of the collector. At spring 604, a similar circuit is closed to the $5.00 start relay 580 of the collector, operating those relays. At spring 605, relay 600 closes a circuit from positive through a resistance, spring 605 and its make contact, the B spring of key K2 and its make contact, conductor 501, through the winding of the start relay 500 in the $2.00 collector of the win pool, operating that relay. At spring 606, relay 600 opens a normally closed link over conductor 607', connecting conductor 948 to conductor 941 without effect at the moment.

Positive placed upon conductor 948 by the routiner start key RSK extends a circuit which may be traced from positive on this conductor through spring 811 and its break contact, FIG. 8, conductor 947, spring 801 and its break contact, conductor 946, through spring 921 and its break contact, FIG. 9, conductor 945, spring 931 and its break contact, conductor 944, through spring 911 and its break contact, conductor 943, through spring 961 and its break contact, conductor 750, through the make contact of and the A spring of the key KW, FIG. 7, conductor 618, through the winding of the T relay 610 in the win section of the routiner, to negative, operating relay 610.

Figure 10:
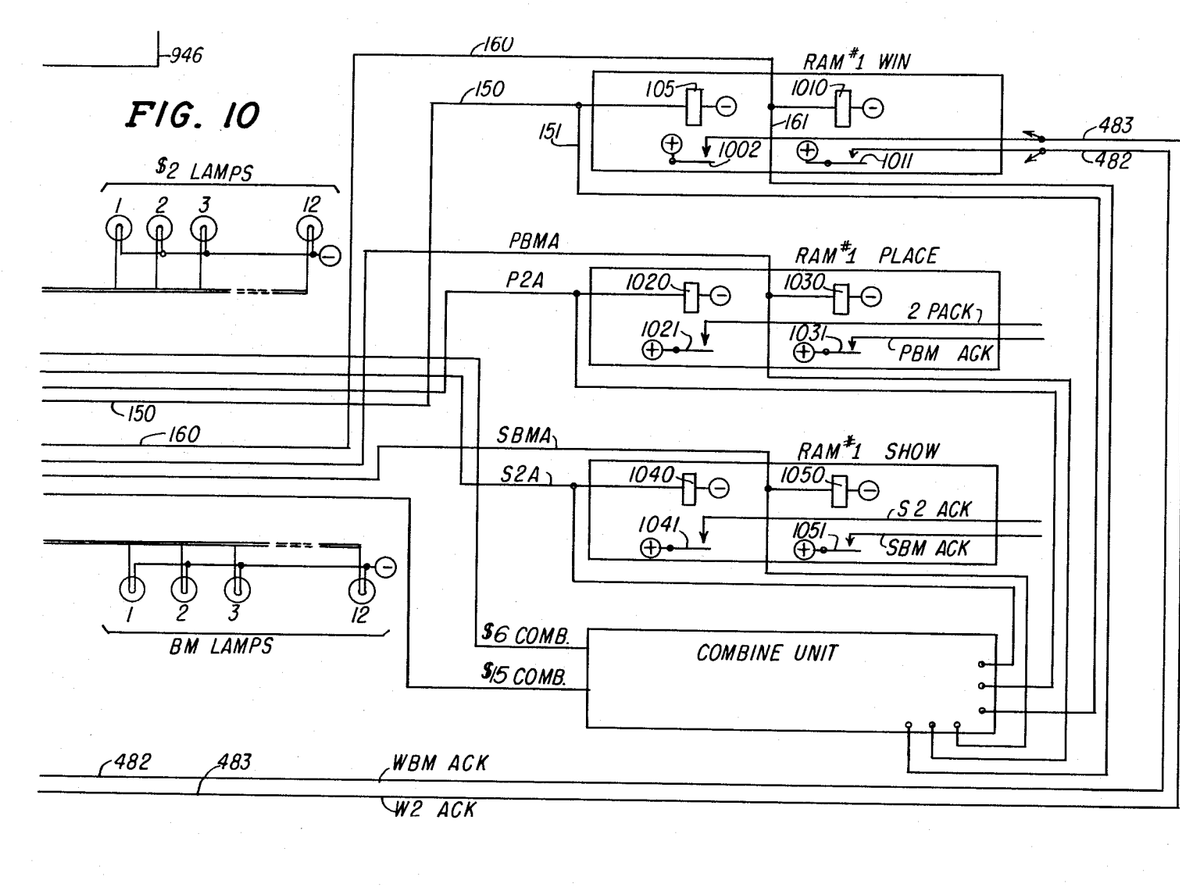
FIG. 10 is a diagrammatic illustration of the RAM's in the win, place and show pools and the combine unit of routiner.
Figure 11:
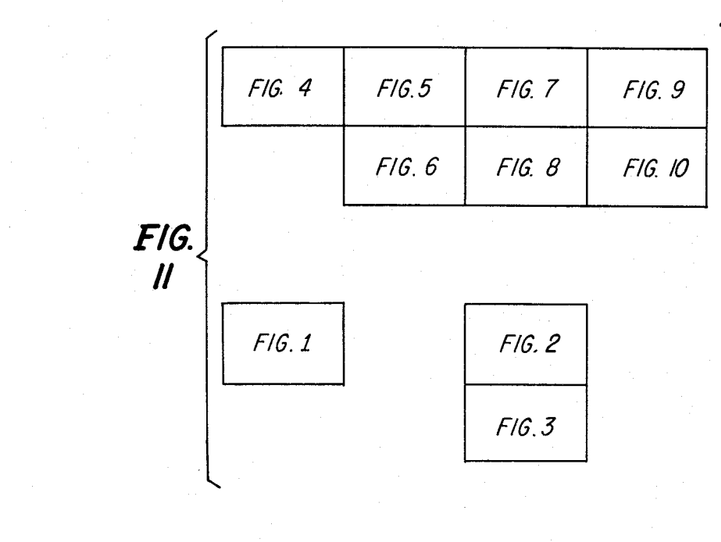
FIG. 11 is a diagram illustrating the manner in which the various figures of the drawing are to be connected together.

Operation of the start relays 520, 540, 560 and 580 of the big money collector for the win pool started that collector in operation and when the collector relay 530 associated with the start relay 520 is operated a circuit is closed from positive through resistance 481 and the $50.00 acceptance relay 480 of the win TAM, conductor 484, spring 444 and its make contact of the reflex relay 440, spring 457 and its break contact, conductor 458, spring 531 and its make contact, conductor 214, through the A spring of the key KF and its make contact, through spring 611 and its make contact, through spring 623 and its break contact, through the upper winding of acceptance relay 620 to conductor 627, wiper 814 of the big money runner access switch and the first contact of its bank engaged thereby, conductor 160, through the winding of the big money acceptance relay 1010 of the RAM 1 in the win pool, FIG. 10, to negative. Relays 1010 and 480 operate over this circuit but relay 620 does not receive sufficient current to enable it to operate.

Operation of relay 1010 at springs 1011 places positive on the big money acknowledging conductor 482, spring 485 and its make contact, to the junction of resistance 481 and relay 480, thereby short-circuiting that resistance to increase the current flowing through relay 620 sufficiently to cause that relay to operate. Operation of relay 610 extends positive through spring 616 and its make contact, to conductor 618', and relay 620 at spring 624 completes a holding circuit from this positive through the lower winding of the relay to negative.

Operation of relay 620 moves spring 623 away from its break contact thereby opening the circuit of relay 480 and relay 1010, causing relays 480 and 1010 to restore.

As is explained in the above mentioned co-pending application, the operation of an acceptance relay in the TAM such as relay 480, for example, removes positive from the start circuit of the collector, stopping that collector so long as the TAM relay remains operated. Restoration of relay 480 therefore re-applies positive to the start chain of the collector, not shown, and in due course collector relay 550 will be operated. Operation of this relay extends a circuit from positive through resistance 481, through the $100.00 acceptance relay 470 of the win TAM, conductor 471, spring 443 and its make contact, spring 455 and its break contact, conductor 456, spring 551 and its make contact, conductor 213, through the A spring and its make contact of the key KH, through spring 612 and its make contact, through spring 633 and its break contact, through the upper winding of $100.00 acceptance relay 630 of the routiner and thence over the previously traced circuit, over conductor 627 to the relay 1010, to negative. Relays 470 and 1010 operate as before and when the acknowledging circuit is completed, relay 630 operates and moves springs 633 away from its break contact thereby to open its circuit through its upper winding. At spring 634, relay 630 closes a holding circuit from positive on conductor 618', through the lower winding of the relay, to negative.

Relays 470 and 1010 restore as before and in due course collector relay 570 is operated to close the circuit from the $10.00 acceptance relay 460 of the win TIM through the upper winding of relay 640 to conductor 627 and relay 1010 as before. Relays 460 and 1010 operate and upon completion of the acknowledging circuit relay 640 operates to open the circuit through its upper winding. At spring 644 and its make contact, relay 640 extends a holding circuit through its lower winding to positive on conductor 618'.

In a similar manner relay 650 is operated over its upper winding in series with $5.00 acceptance relay 430 of the win TAM and relay 1010, and upon operating opens the circuit through its upper winding at springs 653. At spring 654, relay 650 extends positive on conductor 618' through its lower winding to negative to hold the relay operated.

Thus it will be seen that relays 620, 630, 640 and 650 and other similar relays, not shown, through the operation of which big money bets are inserted in the win pool through the BM collector, are operated in sequence one at a time. It will be noted that a circuit of $5.00 acceptance relay 430 of the win TAM extends through break contact 441 on the reflex relay 440, rather than through make contacts on this relay as do the circuits of the other acceptance relays 460, 470 and 480. This is because in the examples shown, the $5.00 bets are assumed to be placed over the main chain of the collector, and the $10.00, $50.00 and $100.00 bets placed over the reflex chain thereof, as more fully explained in the above mentioned co-pending application.

Simultaneously with the operations of the start relays of the BM collector of the win pool, start relay 500 of the $2.00 collector of that pool is operated and in due course collector relay 510 associated therewith is operated. Since the $2.00 collector is entirely independent of the BM collector, operation of relay 510 is in no way dependent upon the operations in the BM channel. Operation of relay 510 closes a circuit from positive through resistance 401, $2.00 acceptance relay 400 of the win TAM, conductor 402, spring 411 of the reflex relay 410 and its break contact, spring 421 of the reset relay 420 and its break contact, conductor 422, thence over the chain of break contacts leading to spring 511 and its make contact, conductor 210, through the A spring and its make contact of key K2, through spring 615 and its make contact, through spring 663 and its break contact, through the upper winding of relay 660, conductor 667, through the wiper 804 of $2.00 access switch and the first bank contact engaged thereby, conductor 150, through the winding of $2.00 acceptance relay 105 of RAM 1 in the win pool to negative, operating relay 105 and relay 400. At spring 1002, relay 105 places positive on the $2.00 acknowledging conductor 483 which is extended through spring 403 and its make contact, to apply positive to both ends of resistance 401 to short-circuit that resistance, thereby to increase the current flowing through the upper winding of relay 660 sufficiently to cause that relay to operate and open the circuit through its break spring 663. At spring 664, relay 660 extends a holding circuit through its lower winding to positive on conductor 618'.

Each of the acceptance relays of the win section of the routiner has associated with it a lamp which is operated when the relay operates. Thus lamp 626 associated with relay 620, is operated from positive through spring 622 and its make contact, to indicate the completion of the bet over the circuit through the upper winding of the relay. At spring 632, relay 630 closes a circuit from positive through lamp 636 for a similar purpose, and each of the other acceptance relays closes a circuit to the associated lamp in the same manner.

It will be noted that when the start relay 600 is in normal position, previously traced conductor 948 is extended over conductor 607, through spring 606 and its break contact, to conductor 941, and also when keys KF, KH, KT, K5 and K2 are in their respective normal positions conductor 948 is extended through the C springs of these keys and their respective break contacts to conductor 941.

Since in the routiner the keys and circuits thereof of the place section duplicate those of the win section, and the keys of the show section likewise duplicate the win section, except that conductor 948 is not connected to conductor 941 but rather the normally closed contacts on the start relays of the sections which correspond to relay 600, contacts which correspond to relay 606 merely extend a by-pass circuit around the normally closed C springs on the keys of the section.

Acceptance relays 620 through 660 of the win section of the routiner now being in operated position as above explained, positive on conductor 948 is extended through the chain of contacts including 621, 631, 641, 651 and 661 and their respective make contacts, to conductor 941, which conductor is extended through the place and show sections as above, and extended through the combine section of the routiner over by-pass conductor 704, spring 703 and its break contact, by-pass conductor 705, conductor 941, extending through release relay 900 to negative, operating that relay.

It will also be noted that through the operation of the acceptance relays of the win section of the routiner, and springs 625, 635, 645, 655 and 665 thereof, positive is placed on conductor 940 which extends to springs 901 and its make contact, thereby to close a holding circuit for relay 900 to maintain that relay operated so long as any one of the routiner acceptance relays remain operated.

The operation of the routiner responsive to the operation of relay 900 depends upon which of several operating conditions has been selected.

*Inserting the Same Series of Bets in Each of the RAM's in the Win Pool*

When it is desired to insert a single set of bets in each of the RAM's of the pool one at a time in sequence, key KCAS, FIG. 9, is operated to close its B spring against its make contact and key KSAC is also operated to close its B spring against its make contact. Under these conditions operation of relay 900 closes a circuit which may be traced from positive on the B spring to key KCAS and its make contact, conductor 958, the twentieth contact in the bank engaged by wiper 923, conductor 959, spring 902 and its make contact, through the winding of cycle relay 910 to negative, operating that relay. At spring 903, relay 900 closes a circuit from positive through spring 913 and its make contact, spring 912 and its make contact, to relay 910, to hold that relay operated so long as relay 900 remains operated. The positive placed on spring 913 through its make contact is extended over conductor 954 to the indication cycle relay of the system, operating that relay to initiate an indication cycle in the manner explained in the above mentioned co-pending application.

Upon operation of relay 910 a circuit is closed from positive on conductor 948 through the B spring of key KSAC and its make contact, conductor 950, through the twentieth bank contact engaged by wiper 934, conductor 951, spring 915 and its make contact, conductor 952, through the A spring of the repeat key and its break contact, FIG. 7, through the B spring of the repeat key and its break contact, conductor 743, through the winding of the runner step relay 740 to negative. Relay 740 operates over this circuit and at springs 741 and 742 closes the previously traced circuits to the magnets 810 and 800 respectively of the access switches, operating those magnets preparatory to advancing their wipers one step.

The previously traced circuit for the T relay 610 in the win section of the routiner is now open at a plurality of points, namely, at spring 811 by the operation of magnet 810, at the spring 801 by the operation of magnet 800, and at spring 911 by the operation of relay 910. Relay 610 restores opening spring 616 from its make contact, thereby removing positive from conductor 618' to which the acceptance relays 620 to 660 were held operated over their respective lower windings. These relays therefore restore.

When all of the acceptance relays have restored, positive is removed from conductor 940 by the opening of the respective fifth contact of each relay, and as a result of the removal of positive from conductor 940 the holding circuit of relay 900 is opened allowing that relay to restore. Restoration of relay 900 at springs 903 opens the holding circuit of relay 910 allowing that relay to restore. At spring 915, restoration of relay 910 opens the circuit of the runner step relay 740 allowing that relay to restore and open the circuit of magnets 800 and 810 which restore to advance the wipers of these switches to their next bank contacts. Restoration of magnets 800 and 810, together with restoration of relay 910, closes the previously traced circuit for the T relay 610 to operate that relay.

The previously traced circuits to the collector and win TAM are again closed; however, since wiper 804 of the $2.00 access switch is now engaged with its second bank contact, the acceptance relay of the win RAM 2, not shown, will be operated. Wiper 814 of the big money access switch is likewise engaged with its second bank contact, so the big money acceptance relay of the win RAM 2, not shown, which corresponds to relay 1010, will also be operated. The set of bets is thus inserted in the win TAM and RAM 2 therein in the hereinbefore explained manner, and when all of these bets are completed relay 900 is again operated and the previously traced circuits re-operated to step the access switches one more step. This routine is repeated until all of the RAM's in the win pool have been tested.

It will be noted that when wiper 803 of the $2.00 access switch engages its thirteenth bank contact, a circuit will be closed from positive through this wiper, through spring 802 and its break contact, through the winding of magnet 800, to negative, causing that magnet to operate in buzzerlike fashion to advance the wipers of the switch into engagement with their twentieth or home position contacts. A similar circuit for magnet 810 is closed through wiper 813 and its thirteenth bank contact to step the wipers of the BM access switch into engagement with their twentieth or home position contacts.

Upon restoration of the relays 900 and 910 at the completion of the testing of the twelfth RAM in the pool, the circuit of relay 610 is again closed; however, since the wipers of the access switches are now engaged with their respective home position contacts the previously traced circuits to the acceptance relays of the win TAM are not completed. The collector continues to operate and the C relays are operated in turn; however, since the positive is not removed from the collector start chains, the relays of the collector merely chatter.

*Repeating a Set of Bets to Each RAM Before Stepping to the Next RAM*

Assume for the moment that it is desired to repeat the set of bets inserted in RAM 1 five times before stepping to RAM 2. Under these conditions key KSAC will be moved to engage its B spring with its break contact. Key KCAS is positioned with its B spring engaging its make contact as before.

Under these conditions when relay 900 is operated at the end of the inserting of a set of bets in the pool, the previously traced circuit for relay 910 is closed and that relay operated as before. A circuit may now be traced from positive on conductor 948 through the B spring of key KSAC and its break contact, spring 914 and its make contact, through the winding of magnet 930 of the cycle count switch to negative, operating that magnet. At spring 931, magnet 930 opens a point in the previously traced circuit of relay 610, and when that relay restores and relay 900 restores as before, relay 910 is restored to open the circuit of magnet 930 which restores to advance the wipers of the cycle count switch one step.

The set of bets is then inserted and the RAM 1 operated as before, at the end of which the cycle count switch is again stepped. This continues until the switch has been operated to move its wipers 934 into engagement with its fourth bank contact.

When relay 900 is operated at the completion of the inserting of the fifth set of bets in RAM 1, and the relay 910 operated as before, a circuit may then be traced from positive on conductor 948 through the B spring of key KSAC and its break contact, through the A spring of this key and its break contact, through the fourth bank contact now engaged by wiper 934 and that wiper over the previously traced circuit, to the runner step relay 740 to operate that relay. Operation of relay 740 operates the magnets of the access switches as before, and upon restoration of relays 900 and 910 the access switches are stepped one step as before. Relay 610 is then again operated and the same set of bets inserted in the win TAM and RAM 2 five times, at the end of which cycle the access switches are again operated to step their wipers into engagement with the next contact in their bank.

*Repeating a Set of Bets Ten Times Before Stepping to the Next RAM*

Under these conditions key KSAC is operated to engage its B spring with its break contact and to open its A spring from its make contact. Under these conditions cycle count switch must take nine steps to bring its wiper 934 into engagement with its ninth bank contact. When the relay 910 is operated at the completion of the inserting of the tenth set of bets in the RAM, a circuit may be traced from positive on conductor 948 through the B spring of key KSAC and its break contact, through the ninth bank contact engaged by wiper 934 and that wiper, thence over the previously traced circuit to the runner step relay 740, operating that relay. As a result of the operation of relay 740, the access switches are stepped ahead one step as before and the same cycle of bets is inserted in the next RAM ten times before the access switches are again stepped.

*Multiplying by One*

The number of times that a set of bets is inserted in a particular RAM may be multiplied by the joint operation of keys KCAS and KSAC. If for instance key KSAC is operated to close its B spring against its make contact, and key KCAS is positioned with its B spring in engagement with its break contact, when relay 900 is operated at the completion of the inserting of a set of bets, a circuit may be traced from positive through the B spring of key KCAS and its break contact, conductor 955, through spring 904 and its make contact, conductor 956, through the winding of the routine count magnet 920 to negative, operating that magnet preparatory to advancing the wipers of the switch one step. At spring 921, magnet 920 opens the previously traced circuit to relay 610 allowing that relay to restore, and upon restoration of relay 900 the circuit of magnet 920 is opened and that relay restores to advance the wipers of the switch one step. This cycle of operation is repeated until wiper 923 engages its ninth bank contact, and when relay 900 is again operated at the completion of the inserting of the tenth set of bets the circuit may be traced from positive through the B spring of key KCAS and its break contact, through the A spring of this key and its break contact, conductor 905, through the ninth bank contact engaged by wiper 923 and that wiper, conductor 959, spring 902 and its make contact, through the winding of relay 910 to negative. Relay 910 operates over this circuit and the previously traced circuit for magnet 920 is likewise closed and that magnet operated.

Operation of relay 910 closes a circuit which may be traced from positive through the B spring of key KSAC and its make contact, through the twentieth contact engaged by wiper 934, and thence over the previously traced circuit to the runner step relay 740, operating that relay. Thus the ten sets of bets inserted in the RAM through the operation of key KCAS is multiplied by one, and the access switches stepped to the next RAM.

*Multiplying by Five*

If, however, key KSAC is set with its B spring engaging its break contact when cycle relay 910 operates at the end of the inserting of the tenth set of bets in the RAM, a circuit may be traced from positive on conductor 948, through the B spring of key KSAC and its break contact, spring 914 and its make contact, through the winding of magnet 930 to negative. Upon restoration of relay 910 as before, magnet 930 advances its wipers one step, this operation continuing through the inserting of the set of bets fifty times, at which time wiper 934 will be engaged with its fourth bank contact.

It will be noted that upon restoration of the magnet 920, when the wiper 922 thereof is engaged with its ninth bank contact as above assumed, the movement of this wiper 922 in engagement with its tenth bank contact completes the circuit previously traced to conductor 905 and thence through the diode 924 to the tenth contact of the bank engaged by wiper 922, thence through that wiper and the spring 925 and its break contact, through magnet 920 to negative, operating that magnet which opens its own circuit at spring 925. Wiper 922 is thus advanced to its eleventh bank contact and positive is maintained on contacts 11 to 19 of this bank, so that the magnet 920 operates in buzzerlike fashion to position the switch wipers on their twentieth or home position contacts.

When relay 910 is again operated at the completion of the inserting of ten more sets of bets in the RAM, that is, upon the completion of the fiftieth set of bets, a circuit may be traced from positive on conductor 948, through the B spring of key KSAC and its break contact, through the A spring of this key and its break contact, through the fourth bank contact engaged by wiper 934, and thence over the previously traced circuit or runner step relay 740 to operate that relay preparatory to advancing the wipers of the access switch to the next RAM. Thus it will be seen that the same set of bets is inserted in the RAM fifty times before the access switches are operated to extend connections to the next RAM.

Multiplying by Ten

By operating key KSAC to disengage its A spring from its break contact and with the key KCAS having its B spring engaged with its break contact, the cycle of ten sets of bets inserted in a RAM will be multiplied by ten since wiper 934 of the cycle count switch must engage its ninth bank contact before the circuit of the runner step relay 740 is closed. Thus when relay 910 operates at the completion of the inserting of the one-hundredth set of bets in the RAM, the access switches are operated to select the next RAM in the pool.

When key KCAS is operated to move its A spring out of engagement with its break contact and into engagement with its make contact, the set of bets will be repeated eleven times on each RAM since wiper 923 of the routine count switch must be engaged with its tenth bank contact before the circuit is closed to relay 910. This routine of eleven sets of bets will be repeated on each RAM once if the key KSAC is operated to engage its B spring with its make contact; will be repeated five times if the B spring of this key is engaged with its break contact; and will be repeated ten times if the A spring of this key is moved out of engagement with its break contact.

Simultaneous Routine of Two Different RAM's in a Pool

It will be noted that through a momentary operation of key BMSK, FIG. 7, the magnet 810 of the big money access switch can be operated to step that switch to a desired position to select one of the twelve RAM's of a pool. The position of this access switch is tested by operation of the push button 823 to light the lamp corresponding to the position occupied by the switch. In a similar manner, through momentary operation of the key 2SK, magnet 800, of the $2.00 access switch, can be operated to step that switch to select a particular RAM. Through this arrangement one RAM can be routined over the $2.00 channel and simultaneously another RAM can be routined over the big money channel should it be desired to do so.

Continuous Routine of One RAM

It may be advantageous to insert a large number of bets in one RAM after that RAM has been repaired and readjusted to make sure that the repairs have produced the desired results. To accomplish this, the repeat key, FIG. 7, is operated to disengage its A spring from its break contact, thereby opening the circuit over which runner step relay 740 was operated, and as a result the foregoing cycle of 1, 10, 11, 50, 100, 55, or 110 set of bets can be placed in the selected RAM, and these cycles of bets repeated indefinitely.

Stopping the Routine

By moving the B spring of the repeat key, FIG. 7, out of its engagement with its break contact and into engagement with its make contact, when the circuit previously traced to runner step relay is closed, that circuit will be extended over conductor 953 to stop relay 960, instead of to runner step relay 740. Upon operating, relay 960, at spring 962 and its make contact, closes a holding circuit from positive on conductor 948, to maintain the relay operated so long as the start key RSK is in operated position. At springs 961, relay 960 opens the previously traced circuit of relay 610 to maintain that relay de-energized even after the remainder of the points in the circuit thereof are closed by the restoration of the various relays and magnets.

Reset

The various switches of the routiner are restored to their home positions through the operation of reset keys. When the reset key shown in FIG. 9 is operated to move its A spring into engagement with its make contact, the obvious circuit for the magnet 920 is completed through wiper 922 to move that switch into engagement with its tenth bank contact, and through the B spring of this key positive is applied to the tenth bank contact so that the magnet 920 operates in buzzerlike fashion until wiper 922 moves into engagement with its twentieth or home position contact. Engagement of the C spring of this key with its make contact places positive on the contacts 1 to 19 of the bank engaged by wiper 933 of the cycle count switch, causing that switch to operate in buzzerlike fashion until its wipers are moved into engagement with their twentieth or home position contacts.

Moving the runner reset key, FIG. 7, into operating position extends positive through its A spring and its make contact to the bank contacts engaged by wiper 803 of the $2.00 access switch and through the B spring of this key and its make contact, to the contacts in the bank of the big money access switch engaged by wiper 813, whereupon these switches operate in buzzerlike fashion until the wipers are positioned upon their respective twentieth or home position contacts.

The foregoing description of the operation of the routiner in connection with the win pool applies to routining of the place pool and also the show pool in the same manner, if the pool selecting keys KP and KS are operated simultaneously with the key KW and the various keys in the place and show sections of the routiner are operated in the same manner as the keys KF, KH, KT, K5 and K2 of the win section of the routiner. During operation of the routiner a set of bets will will be inserted in the three pools simultaneously, and when all of the acceptance relays in the three pools have been operated the chain circuit of conductor 941 will be completed to operate the relay 900 as above explained.

Combine Section Operation

The combine section of the routiner may also be operated simultaneously with the other sections by operating combine key KC, FIG. 7, and the various keys such as K6C and K15C in the combine section of the routiner. The circuit of the upper winding of the $6.00 acceptance relay 720 is completed in the manner illustrated in FIG. 2 of the drawings, as is the circuit of the upper winding of the $15.00 acceptance relay 730.

Upon operation of these and other relays in the combine section, the chain circuit of conductor 941 is extended through the section, through springs 722 and 732, to operate relay 900 as before.

From the foregoing, it will be apparent that through the operation of the routiner of the present invention the TAM and RAM's of each pool in a totalisator system can be tested simultaneously with the RAM's in the pool tested in sequence. The routiner can be set to routine only one of the pools or two of the pools in addition to all three pools simultaneously. The number of bets inserted in the various adding machines can be varied over wide limits and as a result the operation of the various adding machines can be thoroughly checked in a convenient manner prior to each day's operations at a track.

In the drawings and description I have shown the routiner of the present invention as it will be applied to a two-circuit totalisator system of the type described in my above mentioned co-pending application. The routiner of the present invention may also be applied to other totalisator systems and such application is contemplated.

While I have chosen to show and describe my invention by illustrating a preferred embodiment thereof, I am aware that many modifications and adaptations can be made by one skilled in the art and such is contemplated.

Having thus complied with the statutes and shown and described the preferred embodiment of my invention, what I consider new and desire to have protected by Letters Patent is pointed out in the appended claims.

What I claim is:

1. Equipment for testing the total adding machine, the plurality of individual runner adding machines and the collector of a totalisator by registering predetermined amounts in said adding machines, which equipment comprises:
   a plurality of acceptance relays;
   an access switch for selecting said runner adding machines one at a time in sequence;
   a motor magnet for said switch;
   means including a pair of relays for initiating an operation of said collector to establish circuits from the total adding machine through the collector and said acceptance relays one at a time and to the runner adding machine selected by said switch, over which circuits total and selected runner adding machines are operated to register amounts therein and the acceptance relays are operated one at a time;
   a release relay operated over a circuit through a chain of contacts on said test acceptance relays when all of said test acceptance relays have been operated;
   a step relay operated over a circuit closed responsive to the operation of said release relay;
   and means responsive to the operation of said step relay for operating said access switch to select the next runner adding machine to which said test is then applied.

2. Test equipment as specified in claim 1, in which a three-position key is included in the circuit of the step relay which in a first position prepared the circuit to that relay and in a second position opens that circuit to cause the test to be applied repeatedly to a selected runner adding machine, and in which there is a stop relay the circuit of which is prepared by the said key in its third position, which circuit is closed responsive to the operation of the release relay to stop the test.

3. Equipment for testing the total adding machine, the plurality of individual runner adding machines and the collector of a totalisator by registering predetermined amounts in said adding machines, which equipment comprises:
   a plurality of acceptance relays;
   an access switch for selecting said runner adding machines one at a time in sequence;
   a motor magnet for said switch;
   means including a pair of relays for initiating an operation of the collector to establish circuits from the total adding machine through the collector and said acceptance relays one at a time to the runner adding machine selected by said switch, over which circuits the total and selected runner adding machines are operated to register amounts therein and said acceptance relays are operated in sequence;
   and means responsive to the operation of all of said acceptance relays for operating said magnet to step said access switch to select the next runner adding machine to which said test is then applied.

4. Test equipment as specified in claim 3, in which the means for stepping the switch includes a release relay operated over a circuit that extends through a chain of contacts on said acceptance relays and is closed when all of said relays have operated; a routine count switch having a magnet the circuit of which is closed by the operation of said release relay to step the count switch; a cycle relay operated over a circuit closed by the operation of said release relay after said count switch has been operated through a predetermined number of steps; and means responsive to the operation of said cycle relay for operating said magnet to operate the access switch to select the next runner adding machine to which said test is then applied.

5. Test equipment as specified in claim 4, in which the means responsive to the operation of the cycle relay includes a cycle count switch having a magnet the circuit of which is closed by the operation of the cycle relay; and a step relay operated over a circuit closed by the operation of the cycle relay after said cycle count switch has taken a predetermined number of steps, to operate the magnet of the access switch to select the next runner adding machine to which said test is then applied.

6. Test equipment as specified in claim 4, in which the circuit of the cycle relay extends through a wiper on the routine count switch and in which there is a three-position key selectively operable to determine the number of steps the switch must take to close said circuit and operate the relay.

7. Test equipment as specified in claim 6, in which operation of the key to one position opens a point in the circuit of the magnet of the count switch and prepares the circuit of the cycle relay for immediate closing by the operation of the release relay; operation of the key to a second position prepares the circuit of the cycle relay for closing upon the tenth operation of the release relay; and operation of the key to a third position prepares the circuit of the cycle relay for closing upon the eleventh operation of the release relay.

8. Test equipment as specified in claim 4, in which the circuit of the step relay extends through a wiper on the cycle count switch and in which there is a three-position key selectively operable to determine the number of steps the switch must take to close said circuit and operate the relay.

9. Test equipment as specified in claim 8, in which operation of the key to one position opens a point in the circuit of the magnet of the cycle count switch and prepares the circuit of the step relay for immediate closing by the operation of the cycle relay, operation of the key to a second position prepares the circuit of the step relay for closing upon the fifth operation of the cycle relay, and operation of the key to a third position prepares the circuit of the step relay for closing upon the tenth operation of the cycle relay.

10. Equipment for testing a totalisator system that has win, place and show totalisators and a combine unit, with each totalisator having a total adding machine, a plurality of individual runner adding machines, and a collector, and in which there is a collector individual to the combine unit, which equipment applies tests to the system by registering predetermined amounts in each of the adding machines in each totalisator, and comprises:
   a section for each totalisator and a section for the combine unit;
   a plurality of acceptance relays in each test section;
   an access switch having a bank engaging wiper for each section of the test equipment and a magnet for operating said wipers step-by-step over their respective banks to select the individual runner adding machines in each totalisator one at a time in sequence;

a pair of relays in each test section operated to start in operation the collector in the totalisator corresponding to that test section and to prepare circuits to the acceptance relays in that section, said collectors operating independently to close circuits from the total adding machines through the collector and acceptance relays to the runner adding machines selected by said switch, over which circuits the adding machines are operated to register amounts therein and the acceptance relays are operated;

a release relay operated over a circuit that extends through chain contacts on said acceptance relays in all of said sections and closed when all of said relays have operated;

and means responsive to the operation of said release relay for operating said magnet to operate the switch and thereby select the next runner adding machines in the totalisators.

11. Equipment for testing a totalisator having a total adding machine and a plurality of individual runner adding machines, each of which machines is operable over two channels to register amounts, and a collector individual to each of said channels, which equipment applies tests to the adding machines and collectors by registering predetermined amounts in the adding machines, and comprises:

a pair of access switches each operable to select said runner adding machines over one of said channels one at a time in sequence;

a motor magnet for each switch, each having a pair of normally closed contacts;

a plurality of acceptance relays each associated with one of said switches and each having a pair of windings and a normally closed pair of contacts;

a test relay operated over a circuit closed through said pairs of magnet contacts to prepare circuits through closed contacts on and one of the windings of each of said acceptance relays and to prepare a holding circuit for the acceptance relay;

a start relay operated to close a collector start circuit for each acceptance relay, said collectors operating to close said prepared circuits from the total adding machine through the collector, the acceptance relay and the access switch associated therewith to the runner adding machine selected thereby, over which circuit the adding machines are operated to register an amount therein and the acceptance relay is operated to open said circuit;

normally open contacts closed by the operation of an acceptance relay to extend said holding circuit through the other winding of that relay to hold it operated;

a release relay;

a circuit for said release relay that extends through a chain of normally open contacts on said acceptance relays and closed when all of said relays are operated to operate the release relay;

means responsive to the operation of said release relay for operating said magnets which open said magnet contacts thereby to restore said test relay, the acceptance relays, the release relay and the magnets, said magnet restoration operating said switches to select the next runner adding machines and reclosing the circuit of the test relay to operate that relay preparatory to repeating the test on said next runner adding machines.

12. Equipment for testing a totalisator having a total adding machine, a collector, and a plurality of individual runner adding machines, which equipment applies tests to the adding machines and collector by registering predetermined amounts in the adding machines, and comprises:

a group of acceptance relays each having a pair of windings and a normally closed pair of contacts;

an access switch for selecting said runner adding machines one at a time in sequence and having a magnet and normally closed contacts opened by the operation of said magnet;

a test relay operated over a circuit closed through said normally closed magnet contacts to prepare circuits through the normally closed contacts on and one of the windings of each of said acceptance relays;

a hold circuit for said acceptance relays prepared by the operation of said test relay;

a start relay operated to close a collector start circuit to the collector for each acceptance relay in the group, said collector operating to close said prepared circuits, one at a time, which circuits extend from the total adding machine, through the collector, the normally closed contacts on and the one winding of the acceptance relay, thence through the access switch to the runner adding machine selected thereby to operate the adding machines to register an amount therein and to operate the acceptance relay which opens said circuit;

normally open contacts on each acceptance relay closed by the operation thereof to extend said holding circuit to the other winding of the relay to maintain it operated;

a release relay;

a circuit for said release relay, extending through a chain of other normally open contacts on said acceptance relays, closed when all of said contacts are closed to operate said release relay;

other normally open contacts on said acceptance relays;

a hold circuit for said release relay extended through said latter contacts in parallel to maintain the release relay operated so long as an acceptance relay is operated;

means responsive to the operation of said release relay for operating said magnet which opens its normally closed contacts to restore said test relay, said acceptance relays and finally said release relay and magnet, said magnet upon restoring operating said switch to select the next runner adding machine and reclosing the circuit of said test relay to operate that relay preparatory to repeating the test on said next runner adding machine.

13. Equipment for testing a totalisator having a total adding machine, a collector, and a plurality of individual runner adding machines, which equipment applies tests to the adding machines and collector by registering predetermined amounts in the adding machines, and comprises:

a plurality of acceptance relays;

a key associated with each of said relays;

normally open contacts on said key closed by an operation thereof to prepare a point in the start circuit of the collector and to prepare a point in the circuit of the associated acceptance relay;

a pair of normally open contacts on each acceptance relay through which contacts a chain circuit is extended;

and normally closed contacts on each key shunting the normally open contacts on the associated acceptance relay to permit extending said chain when said key and the associated acceptance relay remain in normal position.

14. Test equipment as specified in claim 13, in which there is a start relay, associated with said keys and acceptance relays, operable to close said key prepared start circuits and in which normally closed contacts on said start relay close a circuit that shunts said normally closed key contacts and said normally open relay contacts.

References Cited in the file of this patent
UNITED STATES PATENTS 2,622,802   Handley ______________ Dec. 23, 1952
2,828,072   Helsel et al. ___________ Mar. 25, 1958